(12) United States Patent
Wang et al.

(10) Patent No.: US 8,675,322 B2
(45) Date of Patent: Mar. 18, 2014

(54) ELECTROSTATIC DISCHARGE PROTECTION DEVICE

(75) Inventors: Shih-Yu Wang, Hsinchu (TW);
Yao-Wen Chang, Hsinchu (TW);
Tao-Cheng Lu, Hsinchu (TW)

(73) Assignee: MACRONIX International Co., Ltd., Hsinchu (TW)

( * ) Notice: Subject to any disclaimer, the term of this patent is extended or adjusted under 35 U.S.C. 154(b) by 357 days.

(21) Appl. No.: 13/105,270

(22) Filed: May 11, 2011

(65) Prior Publication Data
US 2012/0287539 A1    Nov. 15, 2012

(51) Int. Cl.
*H02H 9/00*    (2006.01)

(52) U.S. Cl.
USPC .......................................... 361/56; 361/91.1

(58) Field of Classification Search
USPC .................................................. 361/56, 91.1
See application file for complete search history.

(56) References Cited

U.S. PATENT DOCUMENTS

| | | | |
|---|---|---|---|
| 5,530,612 A * | 6/1996 | Maloney | 361/56 |
| 5,877,927 A * | 3/1999 | Parat et al. | 361/56 |
| 6,353,520 B1 | 3/2002 | Andresen et al. | |
| 6,442,008 B1 * | 8/2002 | Anderson | 361/56 |
| 6,535,368 B2 * | 3/2003 | Andresen et al. | 361/56 |
| 6,768,616 B2 * | 7/2004 | Mergens et al. | 361/56 |
| 7,636,226 B2 * | 12/2009 | Tyler et al. | 361/91.5 |

FOREIGN PATENT DOCUMENTS

| TW | 200541043 | 12/2005 |
|---|---|---|
| TW | 200644214 | 12/2006 |

OTHER PUBLICATIONS

"Office Action of Taiwan Counterpart Application", issued on Oct. 7, 2013, p. 1-p. 6.

* cited by examiner

*Primary Examiner* — Rexford Barnie
*Assistant Examiner* — Tien Mai
(74) *Attorney, Agent, or Firm* — J.C. Patents

(57) ABSTRACT

An electrostatic discharge (ESD) protection device electronically connected to a pad is provided. The ESD protection device includes K PNP transistors and a protection circuit, wherein K is a positive integer. An emitter of the $1^{st}$ PNP transistor is electronically connected to the pad, a base of the $i^{th}$ PNP transistor is electronically connected to an emitter of the $(i+1)^{th}$ PNP transistor, and collectors of the K PNP transistors are electronically connected to a ground, wherein i is an integer and $1 \le i \le (K-1)$. The protection circuit is electronically connected between a base of the $K^{th}$ PNP transistor and the ground and provides a discharge path. An electrostatic signal from the pad is conducted to the ground through the discharge path and the K PNP transistors.

12 Claims, 9 Drawing Sheets

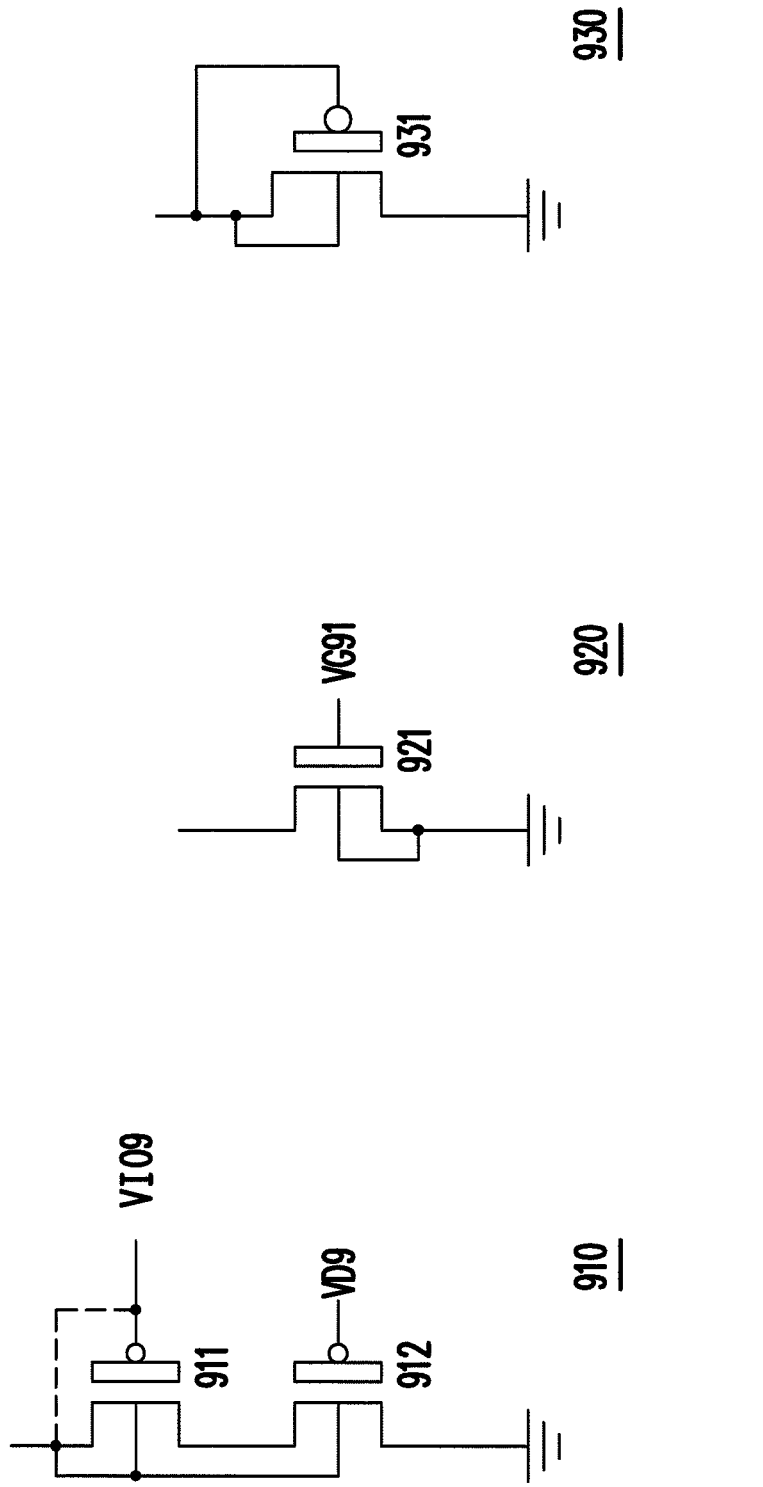

ELECTROSTATIC DISCHARGE PROTECTION DEVICE

BACKGROUND OF THE INVENTION

1. Field of the Invention

The invention generally relates to an electrostatic discharge (ESD) protection device, and more particularly, to an ESD protection device with serially connected PNP transistors.

2. Description of Related Art

Electrostatic discharge (ESD) is a phenomenon of releasing electrostatic charges from non-conductive objects, and which may cause damage to semiconductors and other electronic components in an integrated circuit (IC). When a normal charged body (for example, a person walking on carpet, a machine for packing ICs, or an instrument for testing an IC) gets in contact with a chip, the charged body releases electrostatic discharge to the chip, and the transient power of the ESD may damage or maim ICs in the chip.

In order to prevent the damage caused by ESD to an IC, an ESD protection device is usually disposed in the IC. Generally speaking, there are many different designs of the ESD protection device. A commonly adopted technique to achieve the ESD protection purpose is by using two serially connected N-type transistors, wherein a fixed bias voltage is supplied to the gates of the two serially connected N-type transistors. However, the ESD protection effect provided by such a structure is often affected by process variation, and accordingly the reliability of the ESD protection device is reduced.

SUMMARY OF THE INVENTION

Accordingly, the invention is directed to an electrostatic discharge (ESD) protection device, wherein electrostatic signals are conducted to the ground by serially connected PNP transistors so that the rated current to be supported by a protection circuit is reduced. Thereby, the layout area of the protection circuit, and accordingly the affection of process variation on the ESD protection device, is reduced.

The invention is directed to an ESD protection device, wherein a plurality of branch paths are provided by serially connected PNP transistors so that electrostatic signals are conducted to the ground. Thereby, the rated current to be supported by a protection circuit is reduced, and accordingly the affection of process variation on the ESD protection device, is reduced.

The invention provides an ESD protection device electrically connected to a pad. The ESD protection device includes K PNP transistors and a protection circuit, wherein K is a positive integer. An emitter of the $1^{st}$ PNP transistor is electrically connected to the pad, a base of the $i^{th}$ PNP transistor is electrically connected to an emitter of the $(i+1)^{th}$ PNP transistor, and collectors of the K PNP transistors are electrically connected to a ground, wherein i is an integer, and $1 \leq i \leq (K-1)$. The protection circuit is electrically connected between the base of the $K^{th}$ PNP transistor and the ground and provides a discharge path. An electrostatic signal from the pad is conducted to the ground through the discharge path and the K PNP transistors.

According to an embodiment of the invention, the pad receives a high voltage signal, and the ESD protection device further includes a first control circuit. The first control circuit is electrically connected to the pad and receives a supply voltage. When the supply voltage is supplied, the first control circuit generates an isolation voltage according to the high voltage signal, and the protection circuit or a specific PNP transistor among the K PNP transistors suppresses a leakage current passing through the protection circuit or the specific PNP transistor according to the isolation voltage.

According to an embodiment of the invention, the pad receives a high voltage signal, and the ESD protection device further includes a second control circuit. The second control circuit is electrically connected to the pad and receives a supply voltage. When the supply voltage is supplied, the second control circuit generates a plurality of isolation voltages according to the high voltage signal, and the protection circuit and a part of the PNP transistors suppress a leakage current passing through the protection circuit and the part of the PNP transistors according to the isolation voltages.

According to an embodiment of the invention, the ESD protection device further includes a plurality of diodes, wherein the diodes are respectively disposed between every adjacent two of the K PNP transistors.

The invention provides an ESD protection device electrically connected to a pad. The ESD protection device includes K PNP transistors and a protection circuit, wherein K is a positive integer. The PNP transistors provide K branch paths conducted to a ground. The $1^{st}$ PNP transistor is electrically connected to the pad, the $i^{th}$ PNP transistor is electrically connected to the $(i+1)^{th}$ PNP transistor and provides the $i^{th}$ branch path, and the $K^{th}$ PNP transistor provides the $K^{th}$ branch path, wherein K is a positive integer, i is an integer, and $1 \leq i \leq (K-1)$. The protection circuit is electrically connected between the $K^{th}$ PNP transistor and the ground, and provides a discharge path. An electrostatic signal from the pad is conducted to the ground through the discharge path and the branch paths.

As described above, in the invention, a plurality of serially connected PNP transistors is electrically connected between a pad and a protection circuit so that an electrostatic signal from the pad can be conducted to the ground through the PNP transistors. Accordingly, the rated current to be supported by the protection circuit is reduced. In addition, because the layout area of the protection circuit decreases along with the rated current, the affection of process variation on the ESD protection device is reduced.

It is to be understood that both the foregoing general description and the following detailed description are exemplary, and are not intended to limit the scope of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 9A-9C are respectively a circuit diagram of a protection circuit according to an embodiment of the invention.

DESCRIPTION OF THE EMBODIMENTS

Figure 1:
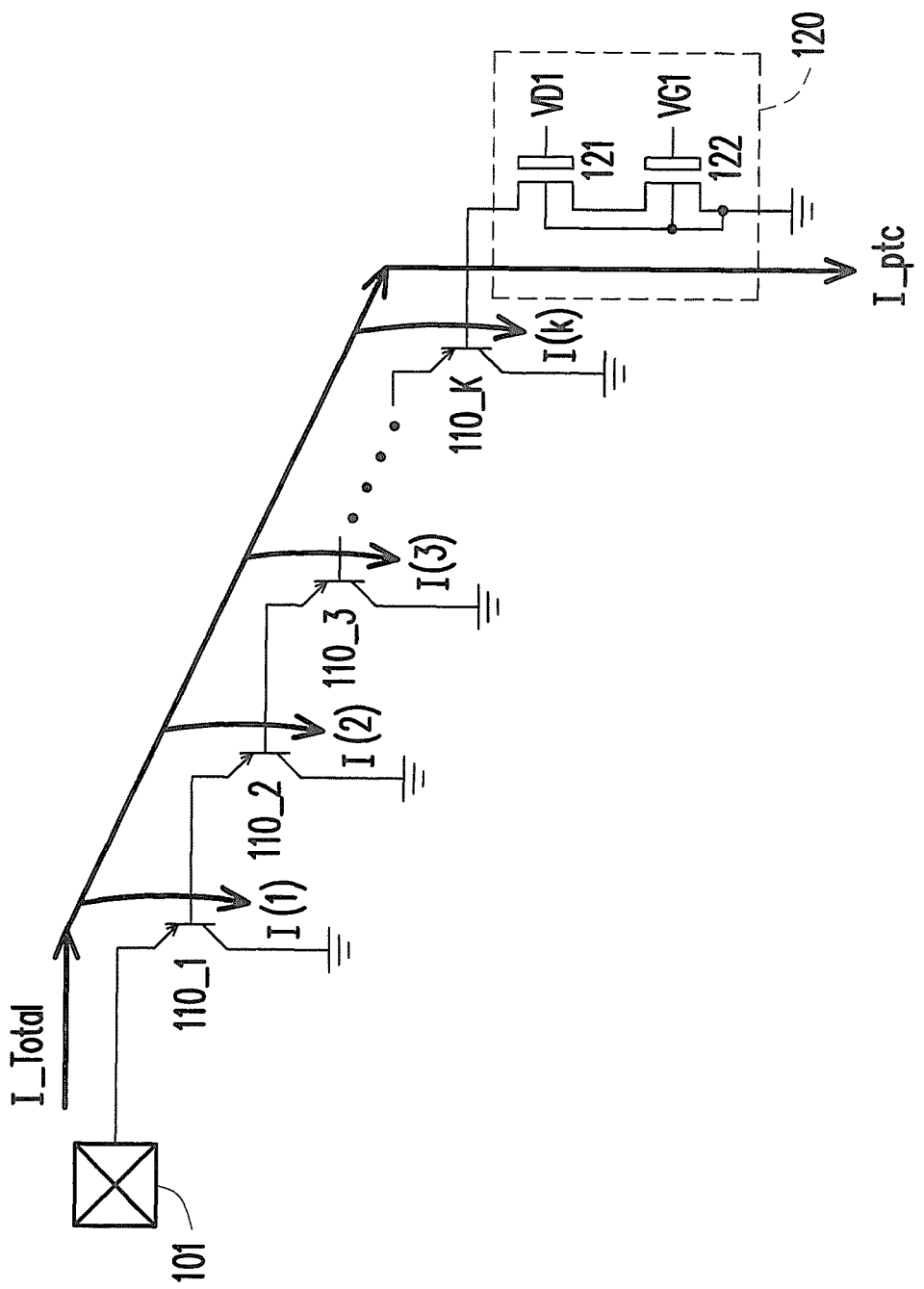
FIG. 1 is a diagram of an electrostatic discharge (ESD) protection device according to a first embodiment of the invention.

Reference will now be made in detail to the present preferred embodiments of the invention, examples of which are illustrated in the accompanying drawings.

Wherever possible, the same reference numbers are used in the drawings and the description to refer to the same or like parts.

First Embodiment

FIG. 1 is a diagram of an electrostatic discharge (ESD) protection device according to the first embodiment of the invention. Referring to FIG. 1, the ESD protection device 100 is electrically connected to a pad 101, and which includes K PNP transistors 110_1-110_K and a protection circuit 120, wherein K is a positive integer. To be specific, the protection circuit 120 includes a NMOS transistor 121 and a NMOS transistor 122. Herein the PNP transistors 110_1-110_K are PNP bipolar junction transistors (BJT), and the NMOS transistors 121 and 122 are N-type metal-oxide-semiconductor field effect transistors (MOSFET).

Regarding the protection circuit 120, the drain of the NMOS transistor 121 is electrically connected to the base of the PNP transistor 110_K, and the gate of the NMOS transistor 121 receives a supply voltage VD1. Besides, the drain of the NMOS transistor 122 is electrically connected to the source of the NMOS transistor 121, the gate of the NMOS transistor 122 receives a ground voltage VG1, and the source of the NMOS transistor 122 is electrically connected to the ground. Regarding the layout of the protection circuit 120, because the two serially connected NMOS transistors 121 and 122 have a parasitic lateral NPN transistor, the protection circuit 120 can provide a discharge path.

The emitter of the 1$^{st}$ PNP transistor 110_1 is electrically connected to the pad 101, and the base of the 1$^{st}$ PNP transistor 110_1 is electrically connected to the emitter of the 2$^{nd}$ PNP transistor 1102. The base of the 2$^{nd}$ PNP transistor 1102 is electrically connected to emitter of the i$^{th}$ PNP transistor 110_3, the base of the 3$^{rd}$ PNP transistor 110_3 is electrically connected to the emitter of the 4$^{th}$ PNP transistor 110_4, ..., and the base of the i$^{th}$ PNP transistor is electrically connected to the emitter of the (i+1)$^{th}$ PNP transistor, wherein i is an integer and 1≤i≤(K−1). Moreover, the collectors of the K PNP transistors 110_1-110_K are electrically connected to the ground so as to form K branch paths.

In an actual application, the pad 101 is electrically connected to an internal circuit (not shown), and the ESD protection device 100 can prevent an electrostatic signal from the pad 101 from damaging the internal circuit without affecting the normal operation of the internal circuit. Thus, when the supply voltage VD1 is supplied, the internal circuit operates normally. Besides, the gate of the NMOS transistor 122 receives the ground voltage VG1 so as to isolate a path to the ground. Thereby, a leakage current produced by the protection circuit 120 is suppressed so that the internal circuit won't be affected by the ESD protection device 100.

When an ESD event occurs, the electrostatic signal from the pad 101 makes the p$^+$-n junctions (i.e., the emitter-base junctions) in the PNP transistors 110_1-110_K to be forward biased. Accordingly, a part of the electrostatic signal shunts to the ground through the p$^+$-n-p structure (i.e. branch paths) in the PNP transistors 110_1-110_K, and the other part of the electrostatic signal is transmitted to the protection circuit 120 through the PNP transistors 110_1-110_K step by step. In addition, the electrostatic signal transmitted to the protection circuit 120 is conducted to the ground through the discharge path foamed by the parasitic NPN transistor.

For example, if an electrostatic current I_Total enters the pad 101 and branch currents I(1), I(2), I(3), ..., and I(K) are respectively formed on the branch paths of the PNP transistors 110_1-110_K, the branch current I_ptc conducted to the protection circuit 120 is expressed as:

$$I\_ptc = I\_Total - I(1) - I(2) - I(3) - \ldots - I(K) \quad \text{Expression (1)}$$

If the common-emitter current gain, this is $\beta=(Ic/I_B)$, is taken to express expression (1), the expression (1) could be rewritten as:

$$I\_Total = (1+\beta)^K I\_ptc \quad \text{Expression (2)}$$

Wherein, K is the number of the PNP transistors, Ic is the collector current of the PNP transistor and $I_B$ is the base current of the PNP transistor.

In other words, when an ESD event occurs, the electrostatic signal from the pad 101 is conducted to the ground through the discharge path of the protection circuit 120 and the branch paths of the PNP transistors 110_1-110_K. Since the electrostatic signal from the pad 101 can be conducted to the ground through the PNP transistors 110_1-110_K, the discharge path of the protection circuit 120 needs not to support a very large electrostatic current. Namely, the rated current supported by the protection circuit 120 is reduced. Correspondingly, the layout area of the protection circuit 120 can be reduced, and the affection of process variation on the ESD protection device 100 can be reduced.

Second Embodiment

Figure 2:
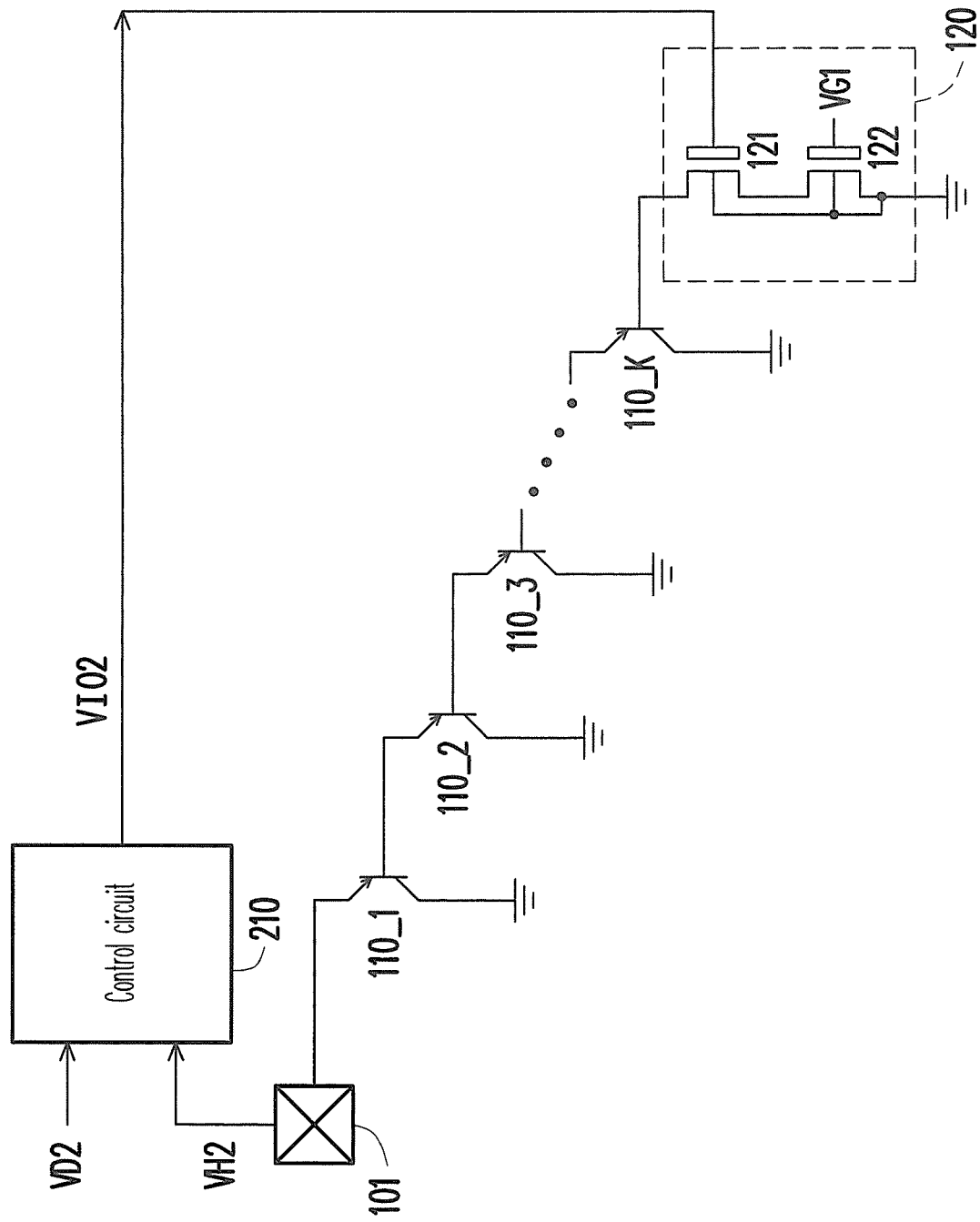
FIG. 2 is a structural diagram of an ESD protection device according to a second embodiment of the invention.

FIG. 2 is a structural diagram of an ESD protection device according to the second embodiment of the invention. Referring to FIG. 2, the present embodiment is similar to the first embodiment, and like reference numerals refer to like elements throughout FIG. 1 and FIG. 2 and will not be described in the present embodiment.

The major difference between the present embodiment and the first embodiment is that the ESD protection device 200 further includes a control circuit 210, and the gate of the NMOS transistor 121 in the protection circuit 120 receives an isolation voltage VIO2. In the present embodiment, the control circuit 210 is electrically connected to the pad 101. In addition, when a supply voltage VD2 is supplied, an internal circuit (not shown) connected to the pad 101 operates normally, and the internal circuit receives a high voltage signal VH2 through the pad 101. On the other hand, herein the control circuit 210 receives the high voltage signal VH2 from the pad 101 and the supply voltage VD2.

Additionally, when the supply voltage VD2 is supplied, the control circuit 210 generates the isolation voltage VIO2 according to the high voltage signal VH2, wherein the isolation voltage VIO2 in the present embodiment is a high voltage level. Thus, when the NMOS transistor 121 in the protection circuit 120 receives the isolation voltage VIO2, the breakdown voltage on the parasitic p-n junction in the NMOS transistor 121 is increased, so that the leakage current passing through the protection circuit 120 is suppressed. In other words, in the present embodiment, when the supply voltage VD2 is supplied, the control circuit 210 generates the isolation voltage VIO2, and the protection circuit 120 suppresses the leakage current passing through the protection circuit 120 according to the isolation voltage VIO2. Referring to the expression (2), the electrostatic current I_Total is decreased with decreasing the branch current I_ptc. Furthermore, when an ESD event occurs, the supply voltage VD2 is not supplied, and the control circuit 210 stops generating the isolation voltage VIO2. Thus, the gate of the NMOS transistor 121 is in a floating state, so as to improve the protection ability of the protection circuit 120.

Moreover, similar to that in the first embodiment, when the ESD event occurs, the electrostatic signal from the pad 101 is conducted to the ground through the discharge path of the protection circuit 120 and the PNP transistors 110_1-110_K, so that the electrostatic signal is prevented from damaging the internal circuit. Furthermore, because the electrostatic signal can be conducted to the ground through the PNP transistors 110_1-110_K, the layout area of the protection circuit 120 can be effectively reduced, and accordingly the affection of process variation on the ESD protection device 200 can be reduced.

Third Embodiment

Figure 3:
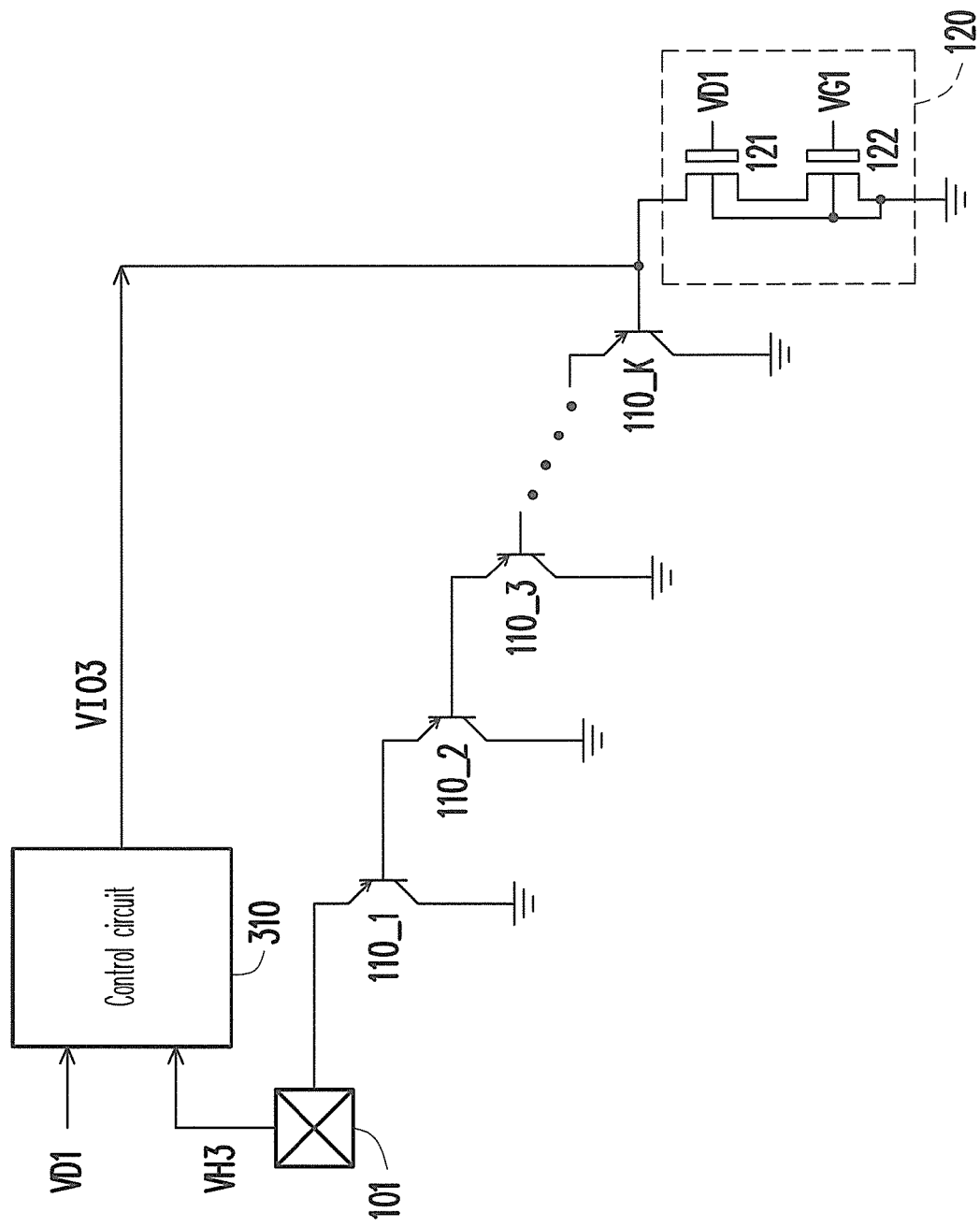
FIG. 3 is a structural diagram of an ESD protection device according to a third embodiment of the invention.

FIG. 3 is a structural diagram of an ESD protection device according to the third embodiment of the invention. Referring to FIG. 3, the present embodiment is similar to the first embodiment, and like reference numerals refer to like elements throughout FIG. 1 and FIG. 3 and will not be described in the present embodiment.

The major difference between the present embodiment and the first embodiment is that the ESD protection device 300 further includes a control circuit 310, and the base of the PNP transistor 110_K further receives an isolation voltage VIO3. In the present embodiment, the control circuit 310 is electrically connected to the pad 101. When the supply voltage VD1 is supplied, an internal circuit (not shown) connected to the pad 101 operates normally, and the internal circuit receives a high voltage signal VH3 through the pad 101. On the other hand, herein the control circuit 310 receives the high voltage signal VH3 from the pad 101 and the supply voltage VD1.

In addition, when the supply voltage VD1 is supplied, the control circuit 310 generates the isolation voltage VIO3 according to the high voltage signal VH3, wherein the isolation voltage VIO3 in the present embodiment is a high voltage level. Thus, when the base of the PNP transistor 110_K receives the isolation voltage VIO3, the emitter-base junction of the PNP transistor 110_K is not forward biased, so that the leakage current passing through the PNP transistor 110_K is suppressed. In other words, in the present embodiment, when the supply voltage VD1 is supplied, the control circuit 310 generates the isolation voltage VIO3 to suppress the leakage current passing through the PNP transistor 110_K. It should be mentioned that even though in the present embodiment, the isolation voltage VIO3 is transmitted to the PNP transistor 110_K, those having ordinary knowledge in the art may also transmit the isolation voltage VIO3 to any one of the PNP transistors 110_1-110_K according to the design requirement, so as to allow the PNP transistor that receives the isolation voltage VIO3 to suppress the generation of the leakage current.

Moreover, similar to that in the first embodiment, when an ESD event occurs, the electrostatic signal from the pad 101 is conducted to the ground through the discharge path of the protection circuit 120 and the PNP transistors 110_1-110_K, so that the electrostatic signal is prevented from damaging the internal circuit. Furthermore, since the electrostatic signal can be conducted to the ground through the PNP transistors 110_1-110_K, the layout area of the protection circuit 120 can be effectively reduced, and accordingly the affection of process variation on the ESD protection device 300 can be reduced.

Fourth Embodiment

Figure 4:
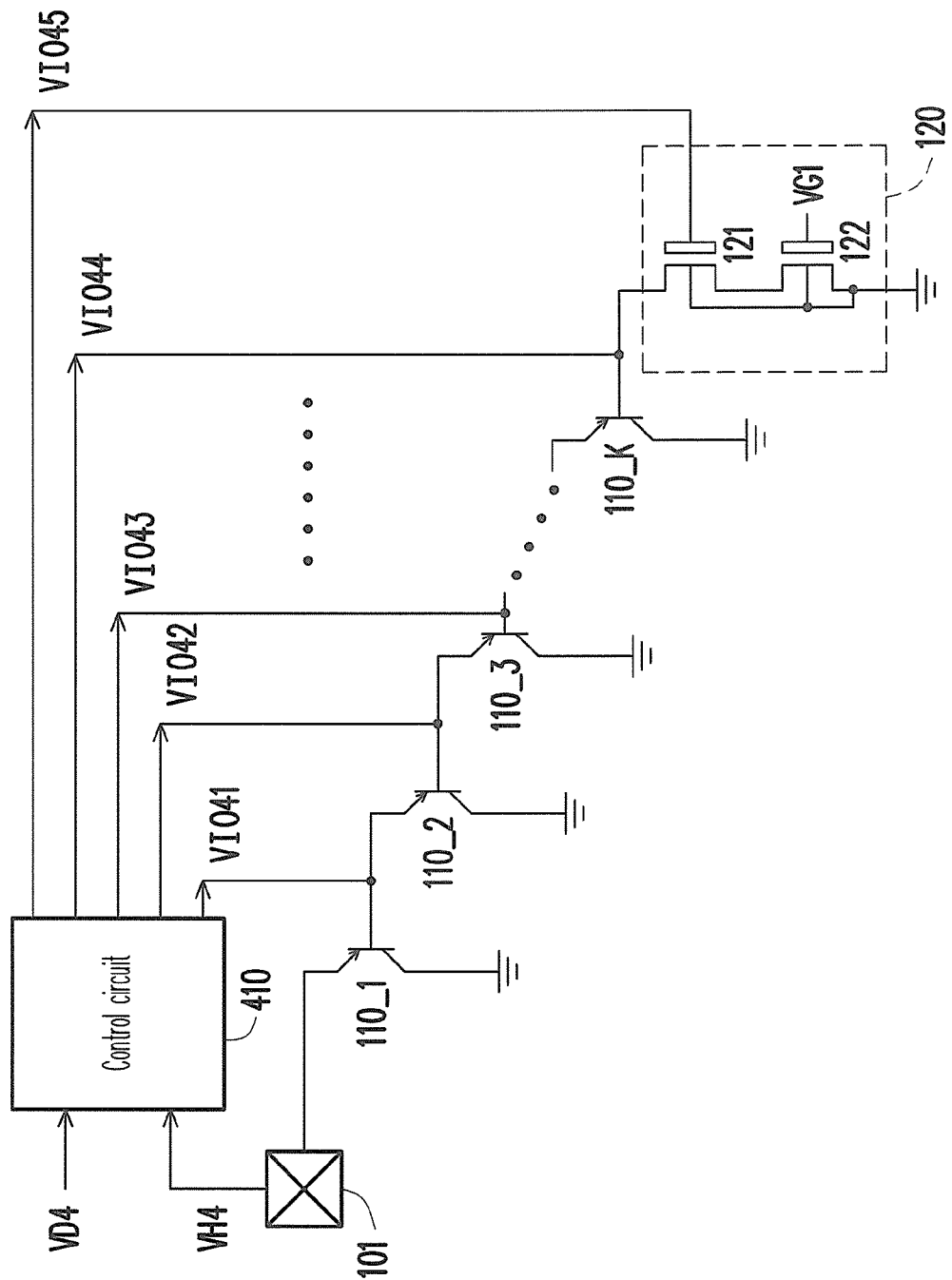
FIG. 4 is a structural diagram of an ESD protection device according to a fourth embodiment of the invention.

FIG. 4 is a structural diagram of an ESD protection device according to the fourth embodiment of the invention. Referring to FIG. 4, the present embodiment is similar to the first embodiment, and like reference numerals refer to like elements throughout FIG. 1 and FIG. 4 and will not be described in the present embodiment.

The major difference between the present embodiment and the first embodiment is that the ESD protection device 400 further includes a control circuit 410, the bases of the PNP transistors 110_1-110_K further receive isolation voltages VIO41-VIO44, and the gate of the NMOS transistor 121 in the protection circuit 120 receives an isolation voltage VIO45. In the present embodiment, the control circuit 410 is electrically connected to the pad 101. When a supply voltage VD4 is supplied, an internal circuit (not shown) connected to the pad 101 operates normally, and the internal circuit receives a high voltage signal VH4 through the pad 101. On the other hand, herein the control circuit 410 receives the supply voltage VD4 and the high voltage signal VH4 from the pad 101.

Moreover, when the supply voltage VD4 is supplied, the control circuit 410 generates the isolation voltages VIO41-VIO45 according to the high voltage signal VH4, wherein the isolation voltages VIO41-VIO45 in the present embodiment are a high voltage level. Thus, when the NMOS transistor 121 in the protection circuit 120 receives the isolation voltage VIO45, the breakdown voltage on the parasitic p-n junction in the NMOS transistor 121 is increased, so that any leakage current passing through the protection circuit 120 is suppressed. Furthermore, when the bases of the PNP transistors 110_1-110_K receive the isolation voltages VIO41-VIO44, the emitter-base junctions thereof are not forward biased, so that any leakage current passing through the PNP transistors 110_1-110_K is suppressed.

In other words, in the present embodiment, when the supply voltage VD4 is supplied, the control circuit 410 generates the isolation voltages VIO41-VIO45, so that the leakage current passing through the protection circuit 120 and the PNP transistors 110_1-110_K can be suppressed. It should be mentioned that even though in the present embodiment, the isolation voltages VIO41-VIO44 are transmitted to all the PNP transistors, those having ordinary knowledge in the art may also transmit the isolation voltages VIO41-VIO44 to part of the PNP transistors according to the design requirement.

Moreover, similar to that in the first embodiment, when an ESD event occurs, the electrostatic signal from the pad 101 is conducted to the ground through the discharge path of the protection circuit 120 and the PNP transistors 110_1-110_K, so that the electrostatic signal is prevented from damaging the internal circuit.

Furthermore, since the electrostatic signal can be conducted to the ground through the PNP transistors 110_1-110_K, the layout area of the protection circuit 120 can be effectively reduced, and the affection of process variation on the ESD protection device 400 can be reduced.

Fifth Embodiment

Figure 5:
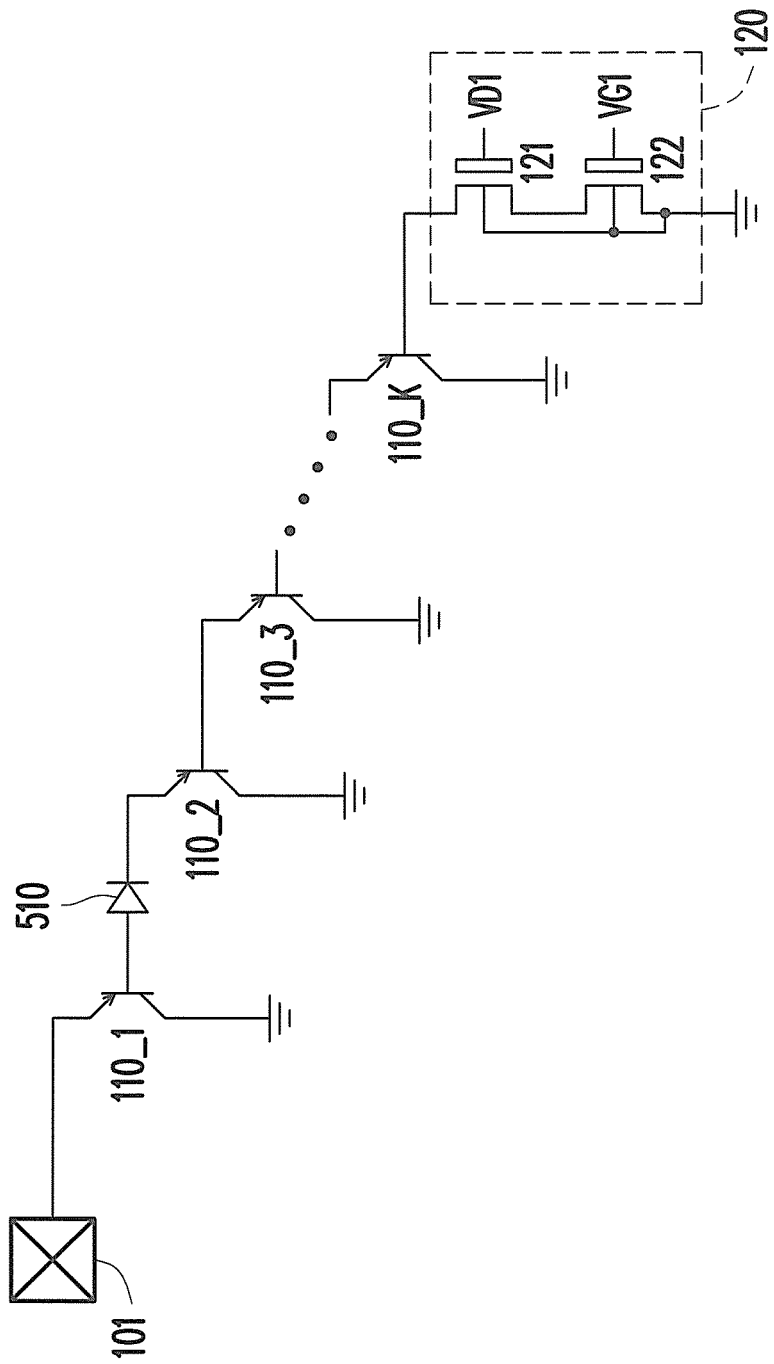
FIG. 5 is a structural diagram of an ESD protection device according to a fifth embodiment of the invention.

FIG. 5 is a structural diagram of an ESD protection device according to the fifth embodiment of the invention. Referring to FIG. 5, the present embodiment is similar to the first embodiment, and like reference numerals refer to like elements throughout FIG. 1 and FIG. 5 and will not be described in the present embodiment.

The major difference between the present embodiment and the first embodiment is that the ESD protection device 500 further includes a diode 510. In the present embodiment, the anode of the diode 510 is electrically connected to the base of the PNP transistor 110_1, and the cathode of the diode 510 is electrically connected to the emitter of the PNP transistor 110_2. Thereby, the voltage drop produced on the diode 510 can prevent the protection circuit 120 from directly receiving a high-level voltage. Accordingly, the breakdown voltage on the parasitic NPN transistor in the protection circuit 120 is correspondingly adjusted. It should be mentioned that even though in the present embodiment, only one diode is disposed among the serially connected PNP transistors 110_1-110_K, those having ordinary knowledge in the art can dispose multiple diodes among the serially connected PNP transistors 110_1-110_K according to the design requirement. In addition, those having ordinary knowledge in the art may also dispose one or more diodes among the PNP transistors 110_1-110_K in the embodiments illustrated in FIGS. 2-4 by referring to the embodiment illustrated in FIG. 5.

Moreover, similar to that in the first embodiment, when an ESD event occurs, the electrostatic signal from the pad 101 is conducted to the ground through the discharge path of the protection circuit 120 and the PNP transistors 110_1-110_K, so that the electrostatic signal is prevented from damaging the internal circuit. Furthermore, since the electrostatic signal can be conducted to the ground through the PNP transistors 110_1-110_K, the layout area of the protection circuit 120 can be effectively reduced, and the affection of process variation on the ESD protection device 500 can be reduced.

Sixth Embodiment

Figure 6:
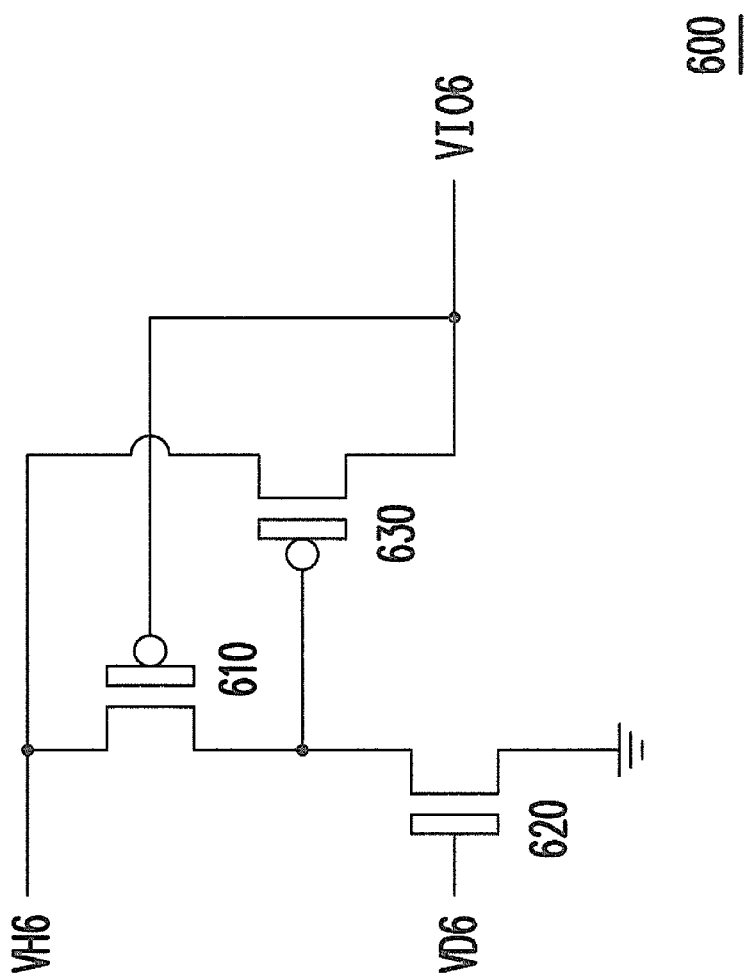
FIG. 6 is a circuit diagram of a control circuit according to an embodiment of the invention.

FIG. 6 is a circuit diagram of a control circuit according to an embodiment of the invention. Referring to FIG. 6, the control circuit 600 receives a supply voltage VD6 and a high voltage signal VH6 and generates an isolation voltage VIO6. In an actual application, the control circuit 210 and the control circuit 310 in the embodiments illustrated in FIG. 2 and FIG. 3 can be implemented with the control circuit 600 illustrated in FIG. 6.

The control circuit 600 includes a PMOS transistor 610, a NMOS transistor 620, and a PMOS transistor 630. The source of the PMOS transistor 610 receives the high voltage signal VH6. The drain of the NMOS transistor 620 is electrically connected to the drain of the PMOS transistor 610, the gate of the NMOS transistor 620 receives the supply voltage VD6, and the source of the NMOS transistor 620 is electrically connected to the ground. The source of the PMOS transistor 630 receives the high voltage signal VH6, the gate of the PMOS transistor 630 is electrically connected to the drain of the PMOS transistor 610, the drain of the PMOS transistor 630 is electrically connected to the gate of the PMOS transistor 610, and the drain of the PMOS transistor 630 generates the isolation voltage VIO6.

When the supply voltage VD6 and the high voltage signal VH6 are supplied, the NMOS transistor 620 is turned on, so that the gate of the PMOS transistor 630 receives a ground voltage. Thus, the PMOS transistor 630 is turned on according to the received ground voltage and generates the isolation voltage VIO6 through the drain thereof. In addition, the isolation voltage VIO6 is sent back to the gate of the PMOS transistor 610 so that the PMOS transistor 610 is latched at an off state.

On the other hand, when an ESD event occurs, the supply voltage VD6 is in a floating state and the voltage level thereof is close to that of the ground voltage. Thus, herein the NMOS transistor 620 cannot be turned on. In addition, the gate of the PMOS transistor 630 is coupled to the high voltage signal VH6 through the parasitic capacitor formed between the gate and source thereof. Thus, the PMOS transistor 630 is also not turned on. Moreover, because the gate of the PMOS transistor 610 is in the floating state and the gate voltage is lower than the high voltage signal VH6, the PMOS transistor 610 is turned on so that the control circuit 600 is latched and prevented from outputting any signal.

Seventh Embodiment

Figure 7:
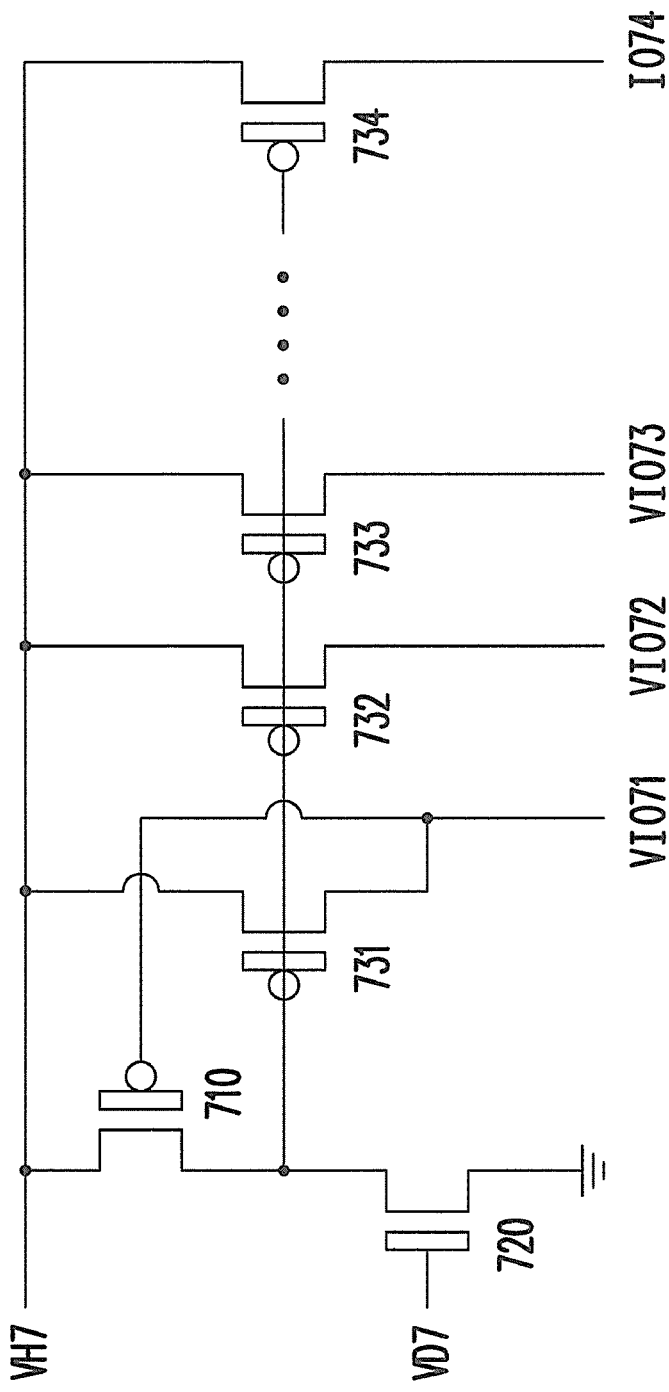
FIG. 7 is a circuit diagram of a control circuit according to another embodiment of the invention.

FIG. 7 is a circuit diagram of a control circuit according to another embodiment of the invention. Referring to FIG. 7, the control circuit 700 receives a supply voltage VD7 and a high voltage signal VH7 and generates a plurality of isolation voltages VIO71-VIO74. In an actual application, the control circuit 410 in the embodiment illustrated in FIG. 4 can be implemented with the control circuit 700 illustrated in FIG. 7.

The control circuit 700 includes a PMOS transistor 710, a NMOS transistor 720, and PMOS transistors 731-734. The source of the PMOS transistor 710 receives the high voltage signal VH7. The drain of the NMOS transistor 720 is electrically connected to the drain of the PMOS transistor 710, the gate of the NMOS transistor 720 receives the supply voltage VD7, and the source of the NMOS transistor 720 is electrically connected to the ground. The sources of the PMOS transistors 731-734 receive the high voltage signal VH7, the gates of the PMOS transistors 731-734 are electrically connected to the drain of the PMOS transistor 710, and the drains of the PMOS transistors 731-734 generate the isolation voltages VIO71-VIO74. Besides, the drain of the PMOS transistor 731 is electrically connected to the gate of the PMOS transistor 710.

When the supply voltage VD7 and the high voltage signal VH7 are supplied, the NMOS transistor 720 is turned on, so that the gates of the PMOS transistors 731-734 receive the ground voltage and accordingly the drains of the PMOS transistors 731-734 generate the isolation voltages VIO71-VIO74. In addition, the isolation voltage VIO71 is sent back to the gate of the PMOS transistor 710 to latch the PMOS transistor 710 in an off state.

On the other hand, when an ESD event occurs, the level of the supply voltage VD7 is close to that of the ground voltage, so that the NMOS transistor 720 cannot be turned on. In addition, the gates of the PMOS transistors 731-734 are respectively coupled to the high voltage signal VH7 through the parasitic capacitors formed between the gates and sources thereof. Thus, the PMOS transistors 731-734 cannot be turned on. Moreover, the gate of the PMOS transistor 710 is in a floating state and the gate voltage thereof is lower than the high voltage signal VH7. Thus, herein the PMOS transistor 710 is turned on so that the control circuit 700 is latched and prevented from outputting any signal.

Eighth Embodiment

Figure 8:
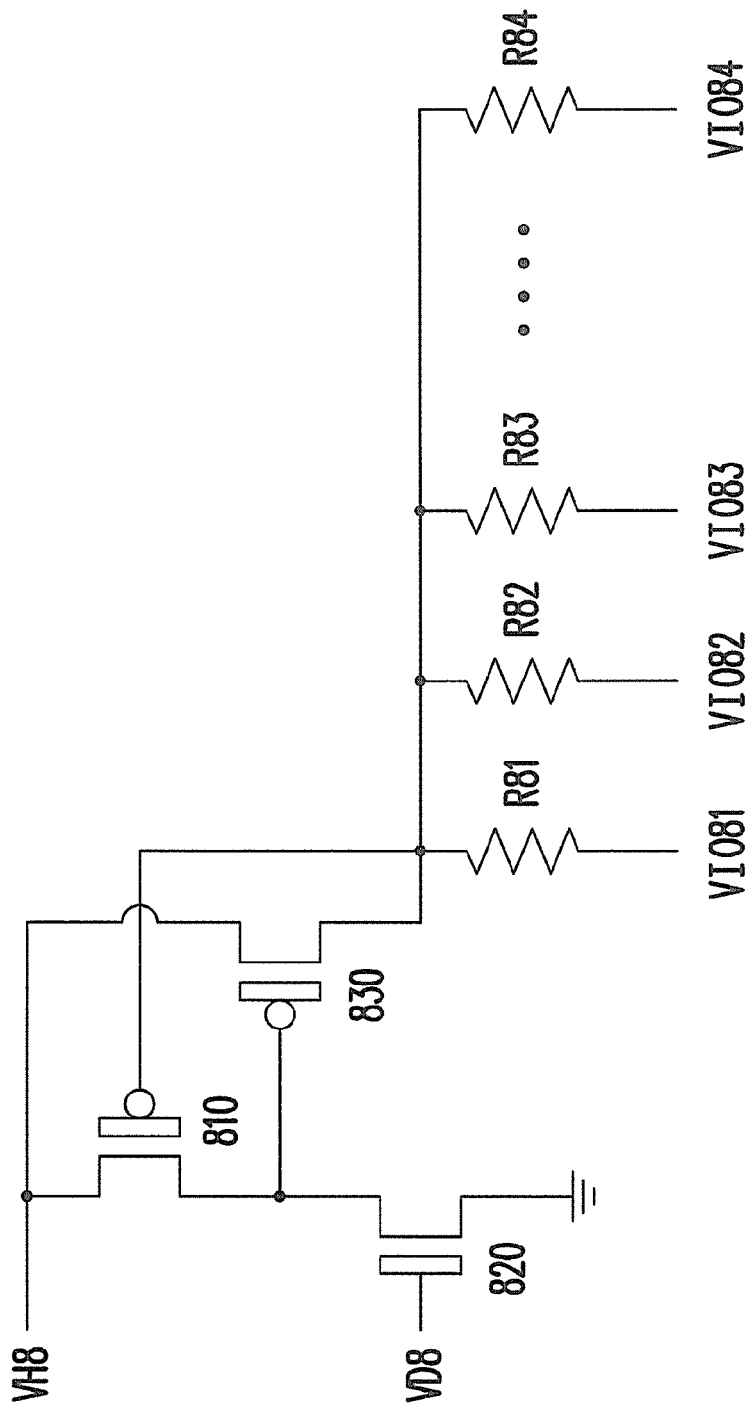
FIG. 8 is a circuit diagram of a control circuit according to yet another embodiment of the invention.

FIG. 8 is a circuit diagram of a control circuit according to yet another embodiment of the invention. Referring to FIG. 8, the control circuit 800 receives a supply voltage VD8 and a high voltage signal VH8 and generates a plurality of isolation voltages VIO81-VIO84. In an actual application, the control circuit 410 in the embodiment illustrated in FIG. 4 can be implemented with the control circuit 800 illustrated in FIG. 8.

The control circuit 800 includes a PMOS transistor 810, a NMOS transistor 820, a PMOS transistor 830, and a plurality of resistors R81-R84. The source of the PMOS transistor 810 receives the high voltage signal VH8. The drain of the NMOS transistor 820 is electrically connected to the drain of the PMOS transistor 810, the gate of the NMOS transistor 820 receives the supply voltage VD8, and the source of the NMOS transistor 820 is electrically connected to the ground. The source of the PMOS transistor 830 receives the high voltage signal VH8, the gate of the PMOS transistor 830 is electrically connected to the drain of the PMOS transistor 810, and the drain of the PMOS transistor 830 is electrically connected to the gate of the PMOS transistor 810 and first ends of the resistors R81-R84. Moreover, second ends of the resistors R81-R84 generate the isolation voltages VIO81-VIO84.

In the present embodiment, the operation mechanisms of the transistors 810, 820, and 830 are the same as those of the transistors 610, 620, and 630 in FIG. 6. When the supply voltage VD8 and the high voltage signal VH8 are supplied, the NMOS transistor 820 and the PMOS transistor 830 are turned on, so that the first ends of the resistors R81-R84 respectively receive the high voltage signal VH8. Thus, the high voltage signal VH8 is respectively biased on the resistors R81-R84 to allow the resistors R81-R84 to generate the isolation voltages VIO81-VIO84. In addition, the PMOS transistor 810 is latched in an off state. On the other hand, when an ESD event occurs, the NMOS transistor 820 and the PMOS transistor 830 cannot be turned on, so that the first ends of the resistors R81-R84 are in a floating state. Moreover, the PMOS transistor 810 is turned on so that the control circuit 800 is latched and prevented from outputting any signal.

Ninth Embodiment

FIGS. 9A-9C are respectively a circuit diagram of a protection circuit according to an embodiment of the invention. As shown in FIG. 9A, the protection circuit 910 is composed of two serially connected PMOS transistors 911 and 912. The source of the PMOS transistor 911 is electrically connected to the base of the $K^{th}$ PNP transistor 110_K. The source of the PMOS transistor 912 is electrically connected to the drain of the PMOS transistor 911, the gate of the PMOS transistor 912 receives a supply voltage VD9, and the drain of the PMOS transistor 912 is electrically connected to the ground.

In an actual application, the PMOS transistor 911 isolates the pad to the ground, and a parasitic lateral PNP transistor in the two serially connected PMOS transistors 911 and 912 provides a discharge path. In an actual application, the gate of the PMOS transistor 911 is electronically connected to the source thereof or receives an isolation voltage VIO9. Thus, when the gate of the PMOS transistor 911 is electronically connected to the source thereof, the protection circuit 120 in the embodiments illustrated in FIG. 1, FIG. 3, and FIG. 5 can be implemented with the protection circuit 910 illustrated in FIG. 9. In addition, when the gate of the PMOS transistor 911 receives the variable isolation voltage VIO9, the protection circuit 120 in the embodiments illustrated in FIG. 2 and FIG. 4 can be implemented with the protection circuit 910 illustrated in FIG. 9.

It should be mentioned that the protection circuit 120 in the embodiments illustrated in FIGS. 1-5 are implemented by using two serially connected NMOS transistors, and the protection circuit 910 in the embodiment illustrated in FIG. 9 is implemented by using two serially connected PMOS transistors. With the fixed layout area, the rated current supported by a NMOS transistor is greater than that supported by a PMOS transistor. Thus, in an actual application, the protection circuit 910 requires a larger layout area in order to support the same rated current as the protection circuit 120. In other words, those having ordinary knowledge in the art can adjust the detailed structure of the protection circuit based on the rated current of the protection circuit. In addition, even though two MOS transistors of the same type are used in each of the embodiments described above, those having ordinary knowledge in the art may also implement the protection circuit by using two MOS transistors of different types.

In addition, the protection circuit may also be implemented by using a single MOS transistor. For example, as shown in FIG. 9B, the protection circuit 920 includes a NMOS transistor 921. The drain of the NMOS transistor 921 is electrically connected to the base of the $K^{th}$ PNP transistor 110_K, the gate of the NMOS transistor 921 receives a ground voltage VG91, and the source of the NMOS transistor 921 is electrically connected to the ground. In addition, as shown in FIG. 9C, the protection circuit 930 includes a PMOS transistor 931. The source and the gate of the PMOS transistor 931 are electrically connected to the base of the $K^{th}$ PNP transistor 110_K, and the drain of the PMOS transistor 931 is electrically connected to the ground. It should be mentioned that a protection circuit implemented by using a single transistor is biased in an off state. Thus, the protection circuit 920 and the protection circuit 930 illustrated in FIG. 9B and FIG. 9C can be respectively applied to the embodiments illustrated in FIG. 1, FIG. 3, and FIG. 5.

In summary, in the invention, a plurality of serially connected PNP transistors are electrically connected between a pad and a protection circuit, so that electrostatic signals from the pad can be conducted to the ground through the PNP transistors and the rated current to be supported by the protection circuit can be reduced. In addition, since the layout area of the protection circuit decreases along with the rated current, the affection of process variation on the ESD protection device can be reduced. Moreover, in an ESD protection device provided by the invention, an isolation voltage is generated by a control circuit so as to suppress any leakage current produced by the protection circuit or the PNP transistors.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electrostatic discharge (ESD) protection device, electrically connected to a pad, the ESD protection device comprising:
    K PNP transistors, wherein an emitter of the $1^{st}$ PNP transistor is electrically connected to the pad, a base of the $i^{th}$ PNP transistor is electrically connected to an emitter of the $(i+1)^{th}$ PNP transistor, and collectors of the PNP transistors are electrically connected to a ground, wherein K is a positive integer, i is an integer, and $1 \le i \le (K-1)$; and
    a protection circuit, for providing a discharge path, wherein an electrostatic signal from the pad is conducted to the ground through the discharge path and the PNP transistors, and the protection circuit comprises two MOS transistors having the same channel, wherein when the protection circuit comprises the two MOS transistors, the two MOS transistors are electrically connected in series between a base of the $K^{th}$ PNP transistor and the ground.

2. The ESD protection device according to claim 1, wherein the pad receives a high voltage signal, and the ESD protection device further comprises:
   a control circuit, electrically connected to the pad, for receiving a supply voltage, wherein when the supply voltage is supplied, the control circuit generates an isolation voltage according to the high voltage signal, and the protection circuit or a specific PNP transistor among the PNP transistors suppresses a leakage current passing through the protection circuit or the specific PNP transistor according to the isolation voltage.

3. The ESD protection device according to claim 2, wherein the control circuit comprises:
   a second PMOS transistor, wherein a source of the second PMOS transistor receives the high voltage signal;
   a NMOS transistor, wherein a drain of the NMOS transistor is electrically connected to a drain of the second PMOS transistor, a gate of the NMOS transistor receives the supply voltage, and a source of the NMOS transistor is electrically connected to the ground; and
   a third PMOS transistor, wherein a source of the third PMOS transistor receives the high voltage signal, a gate of the third PMOS transistor is electrically connected to the drain of the second PMOS transistor, a drain of the third PMOS transistor is electrically connected to a gate of the second PMOS transistor, and the drain of the third PMOS transistor generates the isolation voltage.

4. The ESD protection device according to claim 1, wherein the pad receives a high voltage signal, and the ESD protection device further comprises:
   a control circuit, electrically connected to the pad, for receiving a supply voltage, wherein when the supply voltage is supplied, the control circuit generates a plurality of isolation voltages according to the high voltage signal, and the protection circuit and a part of the PNP transistors suppress a leakage current passing through the protection circuit and the part of the PNP transistors according to the isolation voltages.

5. The ESD protection device according to claim 4, wherein the control circuit comprises:
   a second PMOS transistor, wherein a source of the second PMOS transistor receives the high voltage signal;
   a NMOS transistor, wherein a drain of the NMOS transistor is electrically connected to a drain of the second PMOS transistor, a gate of the NMOS transistor receives the supply voltage, and a source of the NMOS transistor is electrically connected to the ground; and
   a plurality of third PMOS transistors, wherein sources of the third PMOS transistors receive the high voltage signal, gates of the third PMOS transistors are electrically connected to the drain of the second PMOS transistor, a drain of one of the third PMOS transistors is electrically connected to a gate of the second PMOS transistor, and the drains of the third PMOS transistors generate the isolation voltages.

6. The ESD protection device according to claim 4, wherein the control circuit comprises:
   a second PMOS transistor, wherein a source of the second PMOS transistor receives the high voltage signal;
   a NMOS transistor, wherein a drain of the NMOS transistor is electrically connected to a drain of the second PMOS transistor, a gate of the NMOS transistor receives the supply voltage, and a source of the NMOS transistor is electrically connected to the ground;
   a third PMOS transistor, wherein a source of the third PMOS transistor receives the high voltage signal, a gate of the third PMOS transistor is electrically connected to the drain of the second PMOS transistor, and a drain of the third PMOS transistor is electrically connected to a gate of the second PMOS transistor; and
   a plurality of resistors, wherein first ends of the resistors are electrically connected to the drain of the second PMOS transistor, and second ends of the resistors generate the isolation voltages.

7. The ESD protection device according to claim 1 further comprising:
   a plurality of diodes, respectively disposed between every adjacent two of the PNP transistors.

8. The ESD protection device according to claim 1, wherein the two MOS transistors consists of a first NMOS transistor and a second NMOS transistor,
   wherein a drain of the first NMOS transistor is electrically connected to the base of the $K^{th}$ PNP transistor, and a gate of the first NMOS transistor receives a supply voltage or an isolation voltage,
   wherein a drain of the second NMOS transistor is electrically connected to a source of the first NMOS transistor, a gate of the second NMOS transistor receives a ground voltage, and a source of the second NMOS transistor is electrically connected to the ground.

9. The ESD protection device according to claim 1, wherein the two MOS transistors consists of a second PMOS transistor and a third PMOS transistor,
   wherein a source of the second PMOS transistor is electrically connected to the base of the $K^{th}$ PNP transistor, and a gate of the second PMOS transistor is electrically connected to the source thereof or receives an isolation voltage; and
   wherein a source of the third PMOS transistor is electrically connected to a drain of the second PMOS transistor, a gate of the third PMOS transistor receives a supply voltage, and a drain of the third PMOS transistor is electrically connected to the ground.

10. An electrostatic discharge (ESD) protection device, electrically connected to a pad, the ESD protection device comprising:
    K PNP transistors, providing K branch paths conducted to a ground, wherein the $1^{st}$ PNP transistor is electrically connected to the pad, the $i^{th}$ PNP transistor is electrically connected to the $(i+1)^{th}$ PNP transistor and provides the $i^{th}$ branch path, and the $K^{th}$ PNP transistor provides the $K^{th}$ branch path, wherein K is a positive integer, i is an integer, and $1 \leq i \leq (K-1)$; and
    a protection circuit, for providing a discharge path, wherein an electrostatic signal from the pad is conducted to the ground through the discharge path and the branch paths, and the protection circuit comprises two MOS transistors having the same channel type,
    wherein when the protection circuit comprises the two MOS transistors, the two MOS transistors are electrically connected in series between the $K^{th}$ PNP transistor and the ground.

11. The ESD protection device according to claim 10, wherein the pad receives a high voltage signal, and the ESD protection device further comprises:
    a control circuit, electrically connected to the pad, for receiving a supply voltage, wherein when the supply voltage is supplied, the control circuit generates an isolation voltage according to the high voltage signal, and the protection circuit or a specific PNP transistor among the PNP transistors suppresses a leakage current passing through the protection circuit or the specific PNP transistor according to the isolation voltage.

12. The ESD protection device according to claim 10, wherein the pad receives a high voltage signal, and the ESD protection device further comprises:
a control circuit, electrically connected to the pad, for receiving a supply voltage, wherein when the supply voltage is supplied, the control circuit generates a plurality of isolation voltages according to the high voltage signal, and the protection circuit and a part of the PNP transistors suppress a leakage current passing through the protection circuit and the part of the PNP transistors according to the isolation voltages.

* * * * *